United States Patent [19]

Styrnol et al.

[11] Patent Number: 5,299,250
[45] Date of Patent: Mar. 29, 1994

[54] COMPUTER TOMOGRAPHY APPARATUS WITH COMPENSATION FOR FOCUS MIGRATION BY ADJUSTMENT OF DIAPHRAGM POSITION

[75] Inventors: Siegfried Styrnol, Nuremburg; Helmut Winkelmann, Forchheim, both of Fed. Rep. of Germany

[73] Assignee: Siemens Aktiengesellschaft, Munich, Fed. Rep. of Germany

[21] Appl. No.: 990,634

[22] Filed: Dec. 14, 1992

[30] Foreign Application Priority Data

Mar. 5, 1992 [DE] Fed. Rep. of Germany ....... 4207006

[51] Int. Cl.⁵ .............................................. H05G 1/60
[52] U.S. Cl. ....................................... 378/19; 378/151
[58] Field of Search ......................... 378/19, 151, 150

[56] References Cited

U.S. PATENT DOCUMENTS

| | | |
|---|---|---|
| 4,371,976 | 2/1983 | Wagner . |
| 4,803,711 | 2/1989 | Tsuji et al. . |
| 4,934,832 | 6/1990 | Strauss ................................. 378/19 |
| 4,991,189 | 2/1991 | Boomgaarden et al. ........... 378/151 |

Primary Examiner—Craig E. Church
Attorney, Agent, or Firm—Hill, Steadman & Simpson

[57] ABSTRACT

A computer tomography apparatus is disclosed wherein it is assured, given a migration of the focus out of a nominal position, that the radiation detector is always struck approximately centrally by the x-ray beam for the x-ray beams are provided at both ends of the radiation detector, which generate signals that are used to adjust the position of the primary radiation diaphragm, preferably an individual adjustment of the diaphragm plates, such that the x-ray beam always strikes the radiation detector approximately centrally.

3 Claims, 1 Drawing Sheet

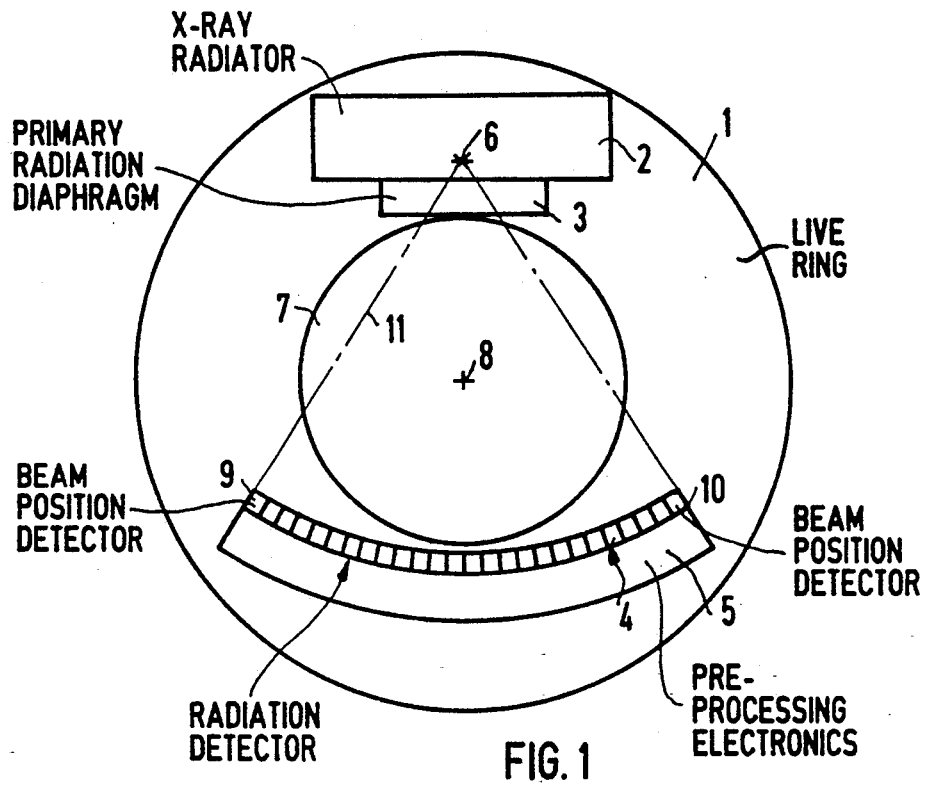
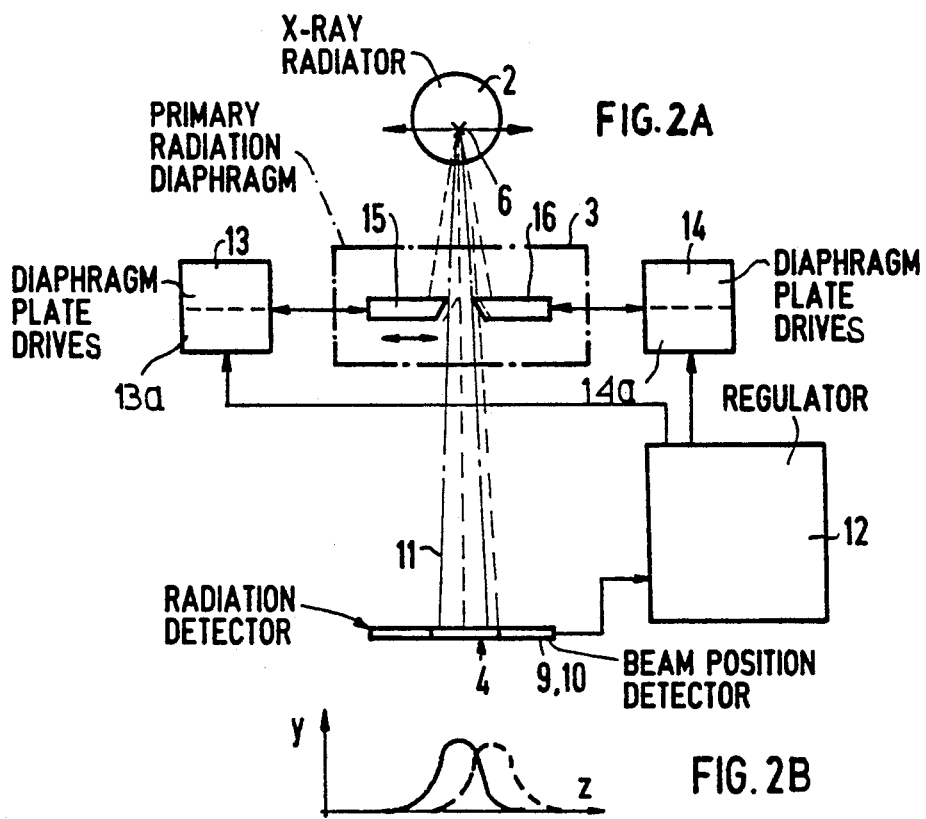

5,299,250

COMPUTER TOMOGRAPHY APPARATUS WITH COMPENSATION FOR FOCUS MIGRATION BY ADJUSTMENT OF DIAPHRAGM POSITION

BACKGROUND OF THE INVENTION

Field of the Invention

The present invention is directed to a computer tomography apparatus of the type having a measuring unit composed of x-ray radiator and radiation detector which rotates around the system axis, as well as position detectors for the x-ray beam whose output signals cause the x-ray beam to be incident on the radiation detector approximately centrally.

Description of the Prior Art

In a computer tomography apparatus, the focus of the x-ray radiator can be slightly displaced given the rotation of the measuring unit, which can possibly result in the radiation detector no longer centrally intercepting by the x-ray beam. It is therefore known to provide a control circuit wherein position of one or both edges the x-ray beam is acquired with the assistance of position detectors and the x-ray radiator is adjusted such that the radiation detector is always approximately centrally struck by the x-ray beam. The adjustment of the x-ray radiator, however, involves considerable technological outlay because of the relatively large mass to be moved.

SUMMARY OF THE INVENTION

It is an object of the present invention is to provide a computer tomography apparatus of the type initially described such that the outlay for compensating changes in the position of the focus is slight. This object is achieved in accordance with the principles of the present invention in a computer tomography apparatus wherein the primary radiation diaphragm is adjusted such that the x-ray beam is always incident the radiation detector approximately centrally. In the computer tomography apparatus of the invention, the migration of the x-ray beam given a change of the focus position is preferably monitored (detected) by two position detectors—particularly in the direction of the system axis—arranged at the two ends of the radiation detector and a corresponding adjustment of the primary radiation diaphragm ensures so that the radiation detector is always centrally struck by x-radiation.

Preferably the diaphragm plates of the primary radiation diaphragm are individually two-dimensionally adjustable, so that the diaphragm plates are also tiltable and an optimum matching of the x-ray beam to the position of the radiation detector is possible.

DESCRIPTION OF THE DRAWINGS

FIG. 1 is an end elevational view of a computer tomography apparatus constructed in accordance with the principles of the present invention.

FIGS. 2a and 2b are schematic block diagrams showing basic components for explaining the invention, in a side view.

DESCRIPTION OF THE PREFERRED EMBODIMENTS

FIG. 1 shows a live ring 1 on which an x-radiator 2, having a primary radiation diaphragm 3, as well as a radiation detector 4, with pre-processing electronics 5, are mounted. The radiation detector 4 is composed of a row of detector elements and is curved around the focus 6 of the x-ray radiator 2. For scanning an examination subject in the measurement opening 7, the measurement unit composed of the x-ray radiator 2 and the radiation detector 4 is turned around the system axis 8, which proceeds perpendicular to the plane of the drawing. A computer (not shown) calculates an image of the examined slice or of the examined volume of the examination subject from the detector output signals and effects the reproduction thereof on a monitor in a known manner.

Two position detectors 9 and 10 are laterally arranged at both ends of the radiation detector 4. These position detectors 9 and 10 monitor and measure the amount of migration of the x-ray beam 11 due to displacements of the focus 6, particularly in the direction of the system axis 8 (direction of the slice thickness).

As shown in FIG. 2, the output signals of the position detectors 9 and 10 are supplied to a regulator 12 that controls two drives 13 and 14 for the respective diaphragm plates 15 and 16 of the primary radiation diaphragm 3. This control is undertaken based on the signals from the detectors 9 and 10 such that the x-ray beam 11—shown with solid lines—is maintained always approximately centrally between the position detectors 9 and 10 and thus always strikes the detector elements of the radiation detector 4 approximately centrally as well. The detector output signal peak is thus located as shown by the solid curve in the y-z plane, whereas without compensation it would be as shown by the dashed curve.

It is particularly expedient to individually adjust the diaphragm plates 15 and 16 on the basis of respective individual drives 13 and 14. The drives 13 and 14 thereby maintained the gap between the diaphragm plates 15 and 16 always at the desired size.

In a further embodiment, the diaphragm plates 15 and 16 are mounted so as to be not just one-dimensionally adjustable, but mounted so as to be two-dimensionally adjustable, so that it is not only a linear but a two-dimensional adjustment of the diaphragm plates 15 and 16 (i.e., a tilting) is possible with the assistance of a corresponding plurality of drives. This means that the diaphragm axis can be tilted relative to the detector axis.

Although modifications and changes may be suggested by those skilled in the art, it is the intention of the inventors to embody within the patent warranted hereon all changes and modifications as reasonably and properly come within the scope of their contribution to the art.

We claim:

1. A computer tomography apparatus comprising:
   an x-ray radiator and a radiation receiver rotatable around an examination volume and around a system axis extending through said examination volume, said x-ray radiator generating an x-ray beam in a plane in a centered position emanating from a focus and incident on said radiation detector having opposite ends, said focus being susceptible to migration during operation causing said x-ray beam to deviate from said centered position along said system axis;
   a primary radiation diaphragm having plates disposed for selectively blocking said x-ray beam;
   position detector means for monitoring a change in position of said x-ray beam along said system axis due to migration of said focus and for generating electrical signals corresponding to said change said position detector means including two detectors respectively laterally disposed at said opposite ends of said radiation detector for detecting deviations of said x-ray beam from said centered position along said system axis; and means supplied with said signals for adjusting said diaphragm plates based on said signals for compensating for migration of said focus in the direction of said system axis by maintaining said x-ray beam approximately in said centered position.

2. A computer tomography apparatus as claimed in claim 1 wherein said means for adjusting said diaphragm plates comprises means for individually adjusting said diaphragm plates.

3. A computer tomography apparatus as claimed in claim 1 wherein said means for adjusting said diaphragm plates comprises means for adjusting said diaphragm plates in two dimensions.

* * * * *